No. 698,690. Patented Apr. 29, 1902.
T. DUNCAN.
ELECTRICAL MEASURING INSTRUMENT.
(Application filed Mar. 8, 1900.)
(No Model.) 2 Sheets—Sheet 1.
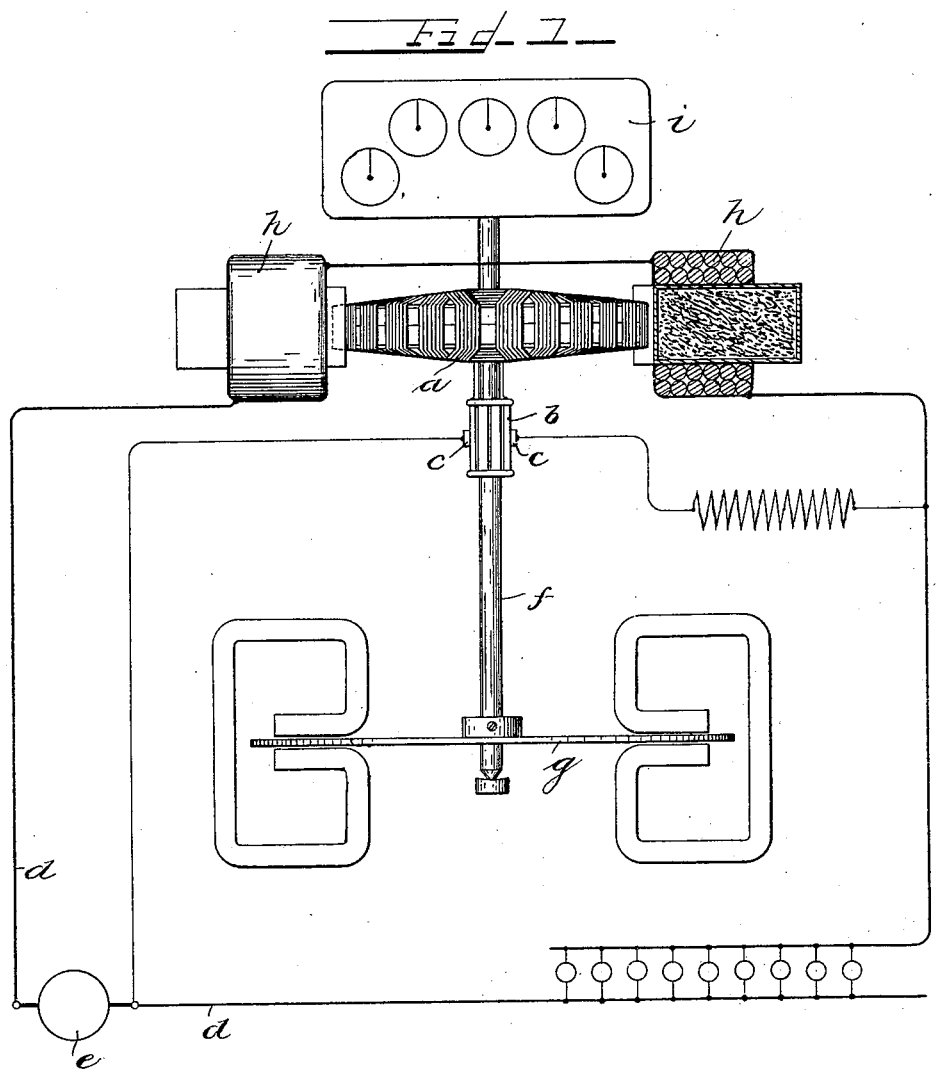

No. 698,690. Patented Apr. 29, 1902.
T. DUNCAN.
ELECTRICAL MEASURING INSTRUMENT.
(Application filed Mar. 8, 1900.)
(No Model.) 2 Sheets—Sheet 2.
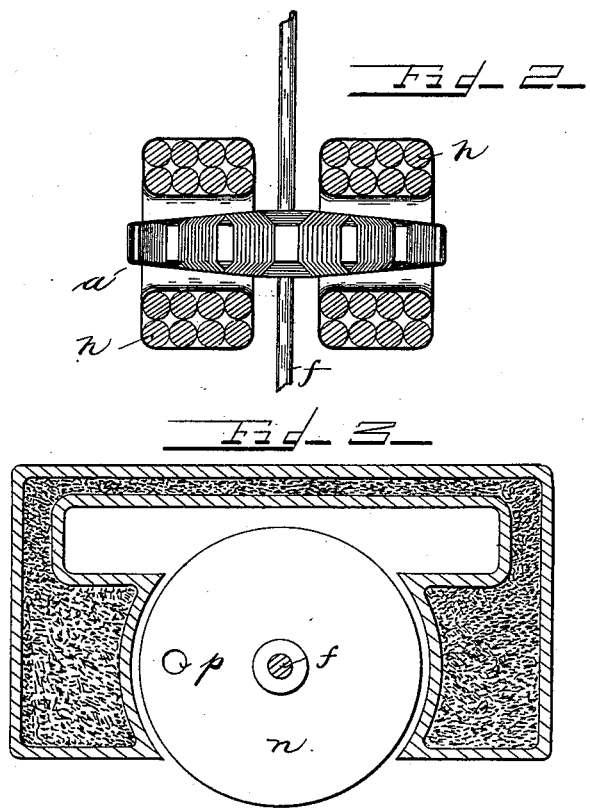
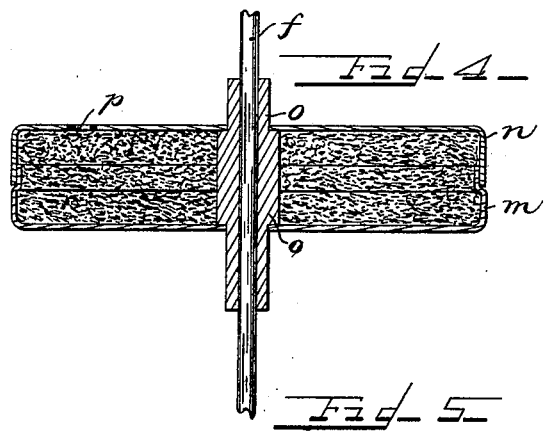
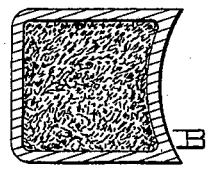
Witnesses
Max W. Zabel.
Chas. J. Schmidt.
Inventor
Thomas Duncan
By Charles A. Brown & Cragg
Attorneys

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,690, dated April 29, 1902.

Application filed March 8, 1900. Serial No. 7,804. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 360,) of which the following is a full, clear, concise, and exact description, reference being had to the accompanying drawings, forming a part of this specification.

My invention relates to electrical measuring instruments, and has for its object the construction of an improved form of meter in which iron may be used electromagnetically where it was hitherto objectionable, because of hysteresis and retentivity.

In practicing my invention the cores are composed of comminuted magnetizable material, preferably iron-filings, which are held in place by casings formed of material affording high resistance to eddy-currents—as, for example, sheet German silver. Sheet-rubber may also be employed efficaciously for this purpose.

The invention is of particular utility in connection with commutated motor-meters, as cores of iron-filings may be advantageously employed for the windings thereof. It has heretofore been endeavored to provide the armature and field windings of commutated meters with laminated cores, which have proven unsuccessful, because of hysteresis in the iron. The meters thus constructed would give readings for a given value upon an increasing load differing from readings upon a decreasing load, due mainly to this cause, tests at different watt intervals showing that the readings upon a decreasing load are higher than upon an increasing load for the same wattage. For this reason the use of iron as hitherto employed is objectionable in meters for measuring direct currents. But for these objectionable features in iron as hitherto employed in connection with direct-current meters its employment would render direct-current meters very efficient. By employing comminuted or finely-divided iron I am enabled to overcome these objections and to increase the efficiency of the meter to an important extent and am enabled to secure correct speeds of the armature upon increasing and decreasing loads, because of the great reduction in hysteresis due to the core being in a finely-divided state, the changes in magnetism being practically instantaneous.

I will explain my invention more particularly by reference to the accompanying drawings, illustrating the preferred embodiment thereof, in which—

Figure 1 is a front elevation of structural parts of a meter made in accordance with my invention, a system of electrical distribution with which the meter is associated being diagrammatically indicated. Fig. 2 is a detail view showing an armature suited for a core of comminuted magnetizable material and a current field-winding having an air-core. Fig. 3 is a plan view showing the core of the armature and a modified form of field-core, the core of the field being shown in section to reveal the filling of comminuted magnetizable material. Fig. 4 is a sectional elevation of the preferred form of armature-core and casing therefor. Fig. 5 is a sectional plan view of one of the field-cores shown in Fig. 1.

Like parts are indicated by similar characters of reference throughout the different figures.

I have indicated a well-known type of direct-current wattmeter in Fig. 1, comprising an armature having coils of even wire $a$, constituting the pressure-winding, provided with a collecting device or commutator $b$, against which brushes $c\,c$ rest to include the armature-winding in bridge between the distributing-mains $d\,d$, receiving current from a direct-current generator $e$. The armature and commutator are mounted on a spindle $f$, at the lower end of which a damping-disk $g$ is secured, which rotates between the poles of the permanent damping-magnets. The distributing mains or conductors $d\,d$ extend to translating devices, one of the said conductors including a series or current winding, in this instance divided into two coils $h\,h$. The counting-train or measuring device $i$ is actuated by the armature shaft or spindle. The armature and field windings of the structure shown in Fig. 1 are preferably each provided with a comminuted core of magnetizable material.

In Fig. 2 I have illustrated a modification, in that the series winding there disclosed is unprovided with a comminuted magnetizable core.

In Fig. 3 I have illustrated a form of field-core in which the cores for the field-coils are united by a yoke also preferably filled with comminuted magnetizable material.

The comminuted cores for the armature and field windings are contained in vessels or receptacles that are preferably sealed and which are preferably made of high-resistance sheet metal, as solder may be used to unite component parts of the receptacles and hermetically seal the same. Sheet German silver is the material preferably employed to form the receptacles of, although I do not wish to be limited to this material. The casing for the comminuted core of the armature is preferably constructed as illustrated in Figs. 3 and 4. One part $m$ of the casing is in the form of a dish having its rim of reduced diameter to engage a corresponding inverted cap $n$, solder being applied at the meeting edge of the cap $n$ with the dish $m$. A hub $o$, preferably made of brass, is placed between the parts $m$ and $n$, the hub being provided with reduced extensions projecting through central holes in the said parts, the hub $o$ being soldered to the parts $m$ and $n$. After the parts $m$ and $n$ have been secured together the comminuted magnetizable material is poured through the hole $p$, filling the space inclosed by the said parts, after which the said hole is sealed in any suitable manner, the granulated or comminuted iron being thereby hermetically sealed. The armature-wire is then disposed about the core thus formed.

The shapes of the cores herein disclosed may be modified without departing from the spirit of my invention.

The meter illustrated is shown of larger size than is absolutely necessary, as I am enabled by means of my invention to construct a meter of about one-fourth the usual size of meters. I am thus enabled to construct a meter that uses much less current than meters as at present constructed.

While I have herein shown and particularly described one embodiment of my invention, I do not wish to be limited to the precise construction shown; but,

Having thus described my invention, I claim as new, and desire to secure by Letters Patent, the following:

1. In a system of distribution, the combination with a source of direct current, of a wattmeter having current and pressure windings receiving current from said source, and a core of comminuted magnetizable material for the current-winding, substantially as described.

2. In a system of distribution, the combination with a source of direct current, of a wattmeter having current and pressure windings receiving current from said source, and a core of comminuted magnetizable material for the pressure-winding, substantially as described.

3. In a system of distribution, the combination with a source of direct current, of a wattmeter having current and pressure windings receiving current from said source, and a core of comminuted magnetizable material for each of said windings, substantially as described.

4. In an electric meter, the combination with the movable winding thereof, of a comminuted core of magnetizable material for said winding, and means for determining the measurement of the meter, substantially as described.

5. In an electric meter, the combination with current and pressure windings, the pressure-winding constituting the armature-winding of the meter of a commutator for conveying the current to the pressure-winding, a core of comminuted magnetizable material for said armature-winding, and means for determining the measurement of the meter, substantially as described.

6. In an electric meter, the combination with current and pressure windings, the pressure-winding constituting the armature-winding of the meter of a commutator for conveying the current to the pressure-winding, a core of comminuted magnetizable material for the current-winding, and means for determining the measurement of the meter, substantially as described.

7. In an electric meter, the combination with current and pressure windings, the pressure-winding constituting the armature-winding of the meter of a commutator for conveying the current to the pressure-winding, a core of comminuted magnetizable material for each of said windings, and means for determining the measurement of the meter, substantially as described.

8. In a wattmeter, the combination with current and pressure windings, of a comminuted magnetizable core for the current-winding, substantially as described.

9. In a wattmeter, the combination with current and pressure windings, of a comminuted magnetizable core for the pressure-winding, substantially as described.

10. In a wattmeter, the combination with current and pressure windings, of a comminuted core of magnetizable material for each of said windings, substantially as described.

In witness whereof I hereunto subscribe my name this 3d day of March, A. D. 1900.

THOMAS DUNCAN.

Witnesses:
MAX W. ZABEL,
CHARLES E. HUBERT.